United States Patent
Mizuno

(10) Patent No.: US 9,647,264 B2
(45) Date of Patent: May 9, 2017

(54) NONAQUEOUS ELECTROLYTE SECONDARY BATTERY

(75) Inventor: Tomoyuki Mizuno, Toyota (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 146 days.

(21) Appl. No.: 14/423,571

(22) PCT Filed: Sep. 4, 2012

(86) PCT No.: PCT/JP2012/072495
§ 371 (c)(1),
(2), (4) Date: Feb. 24, 2015

(87) PCT Pub. No.: WO2014/038001
PCT Pub. Date: Mar. 13, 2014

(65) Prior Publication Data
US 2015/0188123 A1 Jul. 2, 2015

(51) Int. Cl.
*H01M 4/36* (2006.01)
*H01M 4/131* (2010.01)
(Continued)

(52) U.S. Cl.
CPC ........ *H01M 4/364* (2013.01); *H01M 4/131* (2013.01); *H01M 4/505* (2013.01); *H01M 4/525* (2013.01);
(Continued)

(58) Field of Classification Search
CPC ...... H01M 4/364; H01M 4/131; H01M 4/505; H01M 4/525; H01M 4/624; H01M 4/625; H01M 4/5825; Y02E 60/122
See application file for complete search history.

(56) References Cited

U.S. PATENT DOCUMENTS

2004/0253518 A1   12/2004   Hosoya et al.
2007/0202410 A1   8/2007    Takeuchi et al.
(Continued)

FOREIGN PATENT DOCUMENTS

CN   1292505 C      12/2006
JP   11-154515 A    6/1999
(Continued)

OTHER PUBLICATIONS

Denki Kagaku Kogyo K K; "Introduction of Denka Black", Jan. 1, 2004 (Jan. 1, 2004), total of 20 pages; XP055206493, Retrieved from the Internet; URL:http://utsrus.com/index.php?page=shop.getfile8(filejd=10768&productjd=5833&optioncom_virtuemart &Itemid=7 [retrieved on Aug. 5, 2015].

*Primary Examiner* — Laura Weiner
(74) *Attorney, Agent, or Firm* — Sughrue Mion, PLLC

(57) ABSTRACT

A nonaqueous electrolyte secondary battery capable of achieving a high battery performance (e.g., high energy density and high power density) is provided. The nonaqueous electrolyte secondary battery is equipped with a positive electrode having a positive electrode current collector and a positive electrode active material layer that is formed on the positive electrode current collector and includes at least a positive electrode active material and a conductive material. The positive electrode active material includes a lithium-transition metal composite oxide. The conductive material includes a lithium phosphate compound coated, on at least part of the surface thereof, with a conductive carbon, and a proportion of the conductive material in the positive electrode active material layer is 10% by mass or less.

8 Claims, 4 Drawing Sheets

(51) Int. Cl.
*H01M 4/505* (2010.01)
*H01M 4/525* (2010.01)
*H01M 4/62* (2006.01)
*H01M 4/58* (2010.01)

(52) U.S. Cl.
CPC ......... *H01M 4/5825* (2013.01); *H01M 4/624* (2013.01); *H01M 4/625* (2013.01); *Y02E 60/122* (2013.01)

(56) References Cited

U.S. PATENT DOCUMENTS

| | | |
|---|---|---|
| 2010/0248038 A1 | 9/2010 | Takami et al. |
| 2011/0223482 A1 | 9/2011 | Fujii et al. |
| 2012/0270101 A1 | 10/2012 | Higashizaki et al. |

FOREIGN PATENT DOCUMENTS

| | | |
|---|---|---|
| JP | 2006-86116 A | 3/2006 |
| JP | 2010-108889 A | 5/2010 |
| JP | 2010-225486 A | 10/2010 |
| JP | 2011113889 A | 6/2011 |
| JP | 2011-159388 A | 8/2011 |
| JP | 2011-159421 A | 8/2011 |
| JP | 2011198629 A | 10/2011 |
| JP | 2011-228293 A | 11/2011 |
| KR | 10-2004-0089514 A | 10/2004 |
| KR | 1020120080227 A | 7/2012 |

NONAQUEOUS ELECTROLYTE SECONDARY BATTERY

CROSS REFERENCE TO RELATED APPLICATIONS

This application is a National Stage of International Application No. PCT/JP2012/072495 filed Sep. 4, 2012, the contents of all of which are incorporated herein by reference in their entirety.

TECHNICAL FIELD

This invention relates to a nonaqueous electrolyte secondary battery.

BACKGROUND ART

Compared with preexisting batteries, lithium ion secondary batteries and other secondary batteries are small, lightweight and have a high energy density, and also have an excellent power density. For these reasons, in recent years, they have been favored for use as so-called portable power sources for personal computers and handheld devices, and as on-board batteries in vehicles (e.g., power sources for vehicle propulsion).

However, in nonaqueous electrolyte secondary batteries intended for on-board use in vehicles and other applications, there exists a desire for even higher energy density and higher power density in order to increase performance. Such increased performance can be achieved by working innovatively with, for example, the conductive material. Existing art to this effect is described in, for example, Patent Documents 1 and 2. Patent Document 1 discloses that, by using carbon fibers having an average fiber diameter of from 1 to 200 nm as the conductive material, the proportion of active material within the active material layer can be increased and a high energy density can be achieved. Patent Document 2 discloses that, by using a carbon black composite of carbon black coupled with fibrous carbon as the conductive material, contact between the active material and the conductive material can be maintained and improved, enabling resistance within the active material layer to be reduced.

CITATION LIST

Patent Literature

Patent Document 1: JP 2006-86116 A
Patent Document 2: JP 2010-108889 A
Patent Document 3: JP 2011-159421 A

SUMMARY OF INVENTION

Technical Problem

In general, when the state of charge (SOC) of a nonaqueous electrolyte secondary battery becomes low and there is little remaining battery power, the power density decreases. Hence, were it possible to raise the power density in the low SOC region, the desired power density would be achievable over a wider SOC range and the amount of energy capable of being extracted from a unit volume or unit weight of the battery and effectively used could be increased. This is particularly significant in vehicle on-board batteries (e.g., power sources for vehicle propulsion), for which there exists a desire to achieve even higher energy density or higher power density.

In light of the above, the object of this invention is to provide a nonaqueous electrolyte secondary battery that is capable of exhibiting an excellent battery performance (e.g., high energy density, high power density).

Solution to Problem

The nonaqueous electrolyte secondary battery (e.g., lithium ion secondary battery) provided by the invention includes an electrode assembly having a positive electrode and a negative electrode, and a nonaqueous electrolyte. The positive electrode has a positive electrode current collector and a positive electrode active material layer that is formed on the positive electrode current collector and includes at least a positive electrode active material and a conductive material. The positive electrode active material includes at least a lithium-transition metal composite oxide. The conductive material includes a lithium phosphate compound coated, on at least part of the surface thereof, with conductive carbon (which compound is sometimes referred to below as simply a "carbon-coated lithium phosphate compound"). A proportion of the conductive material in the positive electrode active material layer is 10% by mass or less (preferably 7% by mass or less, and more preferably 5% by mass or less) when an overall amount of the positive electrode active material layer is 100% by mass.

Because the positive electrode of the nonaqueous electrolyte secondary battery disclosed herein includes a lithium-transition metal composite oxide (preferably, a lithium nickel cobalt manganese composite oxide) as the positive electrode active material, the battery is capable of exhibiting a high energy density. The positive electrode of the nonaqueous electrolyte secondary battery disclosed herein includes a carbon-coated lithium phosphate compound as the conductive material. In general, because the lithium phosphate compound has a low ionic conductivity and electronic conductivity, the resistance tends to become high. However, as disclosed herein, by coating conductive carbon on the surface of this compound, a low resistance can be achieved, enabling the compound to be advantageously used as a conductive material. Moreover, the lithium phosphate compound has a high theoretical capacity in the low SOC region (e.g., near 3.5 V (vs. Li/Li$^+$)) of the lithium-transition metal composite oxide. Hence, by using this lithium phosphate compound instead of an ordinary conductive material (e.g., a pure carbon material), a high power density can be achieved in the low SOC region (e.g., the SOC≤30% region). In addition, by having the conductive material account for 10% by mass or less of the positive electrode active material layer, that is, by having materials other than this account for at least 90% by mass of the positive electrode active material layer (e.g., having the positive electrode active material account for at least 80% by mass of the positive electrode active material layer), an even higher energy density can be achieved.

In this specification, "nonaqueous electrolyte secondary battery" refers to a battery having a nonaqueous electrolyte (typically, an electrolyte solution containing a supporting salt in a nonaqueous solvent), a typical example of which is a lithium ion secondary battery. Also, in this specification, "lithium ion secondary battery" refers to a secondary battery which utilizes lithium ions as the electrolyte ions, and in which charging and discharge is achieved by the movement of lithium ions between the positive and negative electrodes.

Patent Document 3 mentions that, by using as the positive electrode active material a lithium-transition metal composite oxide having a lithium phosphate compound on part of the surface, a high-capacity nonaqueous electrolyte secondary battery can be achieved. However, according to investigations by the inventors, the lithium phosphate compound mentioned in Patent Document 3 still has a high resistance and, there is a risk of charge/discharge reactions by the lithium-transition metal composite oxide being hindered by direct contact between this high-resistance lithium phosphate compound and the lithium-transition metal composite oxide.

In a preferred embodiment disclosed herein, a proportion of the carbon-coated lithium phosphate compound in the conductive material is from 20% by mass to 70% by mass (preferably from 50% by mass to 70% by mass) when an overall amount of the conductive material is 100% by mass. In other words, the above conductive material may include a type of conductive material which differs from the carbon-coated lithium phosphate compound (the different type of conductive material typically being carbon material such as carbon black, and preferably acetylene black).

By setting the amount of carbon-coated lithium phosphate compound in this range, due to synergistic effects with the other conductive material (e.g., carbon black), even better conductive paths can be formed within the positive electrode active material layer. Therefore, an energy density and a power density which are even higher can both be achieved.

In a preferred embodiment disclosed herein, the conductive carbon is coated in an amount, per 100 parts by mass of the lithium phosphate compound, of from 40 parts by mass to 80 parts by mass. By setting the coating amount to 40 parts by mass or more (e.g., 50 parts by mass or more), a higher conductivity can be imparted to the lithium phosphate compound, enabling its advantageous use as a conductive material. By setting the coating amount to 80 parts by mass or less (e.g., 70 parts by mass or less), an excessive decline in the bulk density of the conductive material can be avoided, enabling a higher density to be achieved in the positive electrode active material layer. Accordingly, in cases where the above range is satisfied, it is possible to achieve an even better energy density and power density.

The lithium phosphate compound preferably includes at least lithium iron phosphate. Lithium iron phosphate can be advantageously used because it is relatively inexpensive compared to other compounds and has an excellent stability on account of the fact that the crystal structure does not readily break down owing to the strong bonds between the phosphorus and the oxygen. Moreover, it is preferable for the conductive carbon to include carbon black (typically, acetylene black). By using carbon black, an even higher conductivity can be advantageously imparted to the lithium phosphate compound.

In a preferred embodiment disclosed herein, the lithium phosphate compound has an average particle size for primary particles thereof, as determined by electron microscopy, of from 50 to 200 nm. In another preferred embodiment disclosed herein, the average particle size of primary particles, as determined in the examination of conductive carbon by electron microscopy, is from 30 to 50 nm. When the particle size of the lithium phosphate compound and/or the conductive carbon satisfies the above range, a carbon-coated lithium phosphate compound having an excellent conductivity and a low bulk density can be achieved. This enables the desirable effects of the invention to be exhibited at an even higher level.

The nonaqueous electrolyte secondary battery (e.g., lithium ion secondary battery) disclosed herein is capable of achieving both a high energy density and a high power density. For example, even at a high initial capacity and in a low SOC region, an excellent power density can be achieved. By exploiting these characteristics, this battery can be advantageously used as a power source (driving power source) for propulsion in hybrid vehicles and electric vehicles. Hence, according to another aspect disclosed herein, the invention discloses a vehicle equipped with such a nonaqueous electrolyte secondary battery.

BRIEF DESCRIPTION OF DIAGRAMS

DESCRIPTION OF EMBODIMENTS

Figure 1:
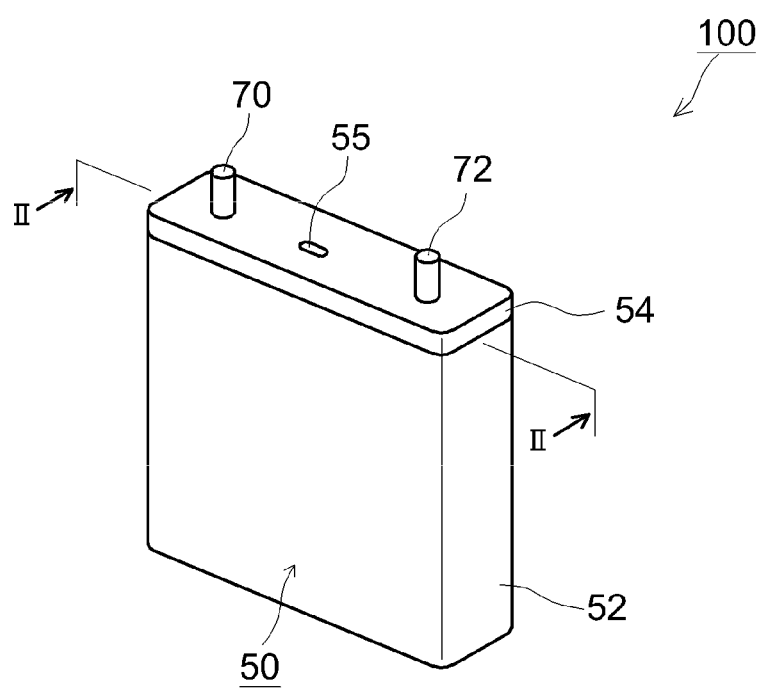
FIG. 1 is a perspective view schematically showing the external shape of a nonaqueous electrolyte secondary battery according to an embodiment of the invention.

Preferred embodiments of the invention are described below. Note that technical matters which are required for carrying out the present invention but are not particularly mentioned in the present specification are matters of design that could be apprehended by a person skilled in the art based on prior art in the field in question. The present invention can be practiced based on the technical details disclosed in the present specification and on common general technical knowledge in the field in question. Lithium ion secondary batteries are sometimes described more fully below as typical examples of the inventive nonaqueous electrolyte secondary battery, although applications of this invention are not intended to be limited to lithium ion secondary batteries.

The nonaqueous electrolyte secondary battery disclosed herein has a construction wherein an electrode assembly having a positive electrode and a negative electrode has been placed, together with a nonaqueous electrolyte, in a given battery case. Such a battery may be built by placing the electrode assembly having a positive electrode and a negative electrode in a battery case, then injecting a predetermined amount of nonaqueous electrolyte into the battery case, and welding or otherwise sealing an opening in the battery case. The structural elements of the battery disclosed herein are each described in turn below.

Positive Electrode

The positive electrode disclosed here has a positive electrode current collector and, formed on the positive electrode current collector, a positive electrode active material layer which includes at least a positive electrode active material and a conductive material. Such a positive electrode can be preferably produced by applying, onto a sheet-like positive electrode current collector, a paste-like or slurry-like composition (positive electrode active material slurry) prepared by dispersing a positive electrode active material, a conductive material and other materials that may be optionally used (such as a binder) within a suitable solvent, and then drying the slurry. Either an aqueous solvent or an organic solvent may be used as the solvent. For example, N-methyl-2-pyrrolidone (NMP) may be used.

The positive electrode current collector is preferably a conductive member made of a metal having good electrical conductivity (e.g., aluminum, nickel, titanium, stainless steel). The shape of the current collector may vary depending on such factors as the shape of the battery to be built, and thus is not particularly limited. For example, the current collector may be in the form of a rod, plate, foil or mesh. In batteries having a wound electrode assembly, use is primarily made of a foil. There is no particular limitation on the thickness of the foil-type current collector, although to achieve a good balance between the battery capacity density and the current collector strength, a foil-type current collector having a thickness of about 5 to 50 μm (and more preferably 8 to 30 μm) may be used.

Positive Electrode Active Material

The positive electrode active material includes at least a lithium-transition metal composite oxide. The lithium-transition metal composite oxide is an oxide which has a layered structure or a spinel structure, and includes as the constituent metal elements lithium and at least one kind of transition metal element (preferably at least one kind from among nickel, cobalt and manganese). One, two or more oxides that have hitherto been used in nonaqueous electrolyte secondary batteries may be used without particular limitation as this oxide. Illustrative examples include lithium-nickel oxides (typically, $LiNiO_2$), lithium-cobalt oxides (typically, $LiCoO_2$), lithium-manganese oxides (typically, $LiMn_2O_4$) and lithium-iron oxides (typically, $LiFeO_2$). Because these lithium-transition metal composite oxides have a high theoretical capacity, higher battery characteristics (e.g., high energy density) can be achieved.

In a preferred embodiment, illustrative examples include lithium nickel cobalt manganese composite oxides which have a layered structure (typically, a layered rock salt structure belonging to the hexagonal crystal system), and include as structural elements lithium, nickel, cobalt and manganese (e.g., $LiNi_{1/3}Co_{1/3}Mn_{1/3}O_2$). Such oxides have a high theoretical capacity, and also have an excellent heat stability. Also, when such lithium nickel cobalt manganese composite oxides are used, there is generally a tendency for the internal resistance to rise in the low SOC region and for the power density to decrease. However, using the art disclosed herein, it is possible to advantageously suppress such a rise in resistance, enabling the desired effects of applying this invention to be more strikingly exhibited.

In a preferred embodiment, the lithium nickel cobalt manganese composite oxide may have a chemical composition expressed by formula (I) below (average composition).

$$Li_{1+x}Ni_yCo_{(1-y-z)}Mn_zM_\gamma O_2 \tag{I}$$

In formula (I), x may be a real number that satisfies that condition −0.1≤x≤0.3, y may be a real number that satisfies the condition 0.1<y<0.9 (preferably 0.2≤0.6), z may be a real number that satisfies the condition 0.2≤y≤0.6, and γ may satisfy the condition 0≤γ≤0.05 (e.g., 0.0005≤γ≤0.03). When 0<γ, M is an element other than Li, Ni, Co and Mn, and may be one, two or more selected from among metal elements and boron (B). More specifically, M may be one, two or more element from among sodium (Na), magnesium (Mg), calcium (Ca), strontium (Sr), titanium (Ti), zirconium (Zr), vanadium (V), niobium (Nb), chromium (Cr), molybdenum (Mo), tungsten (W), iron (Fe), rhodium (Rh), palladium (Pd), platinum (Pt), copper (Cu), zinc (Zn), boron (B), aluminum (Al), gallium (Ga), indium (In), tin (Sn), lanthanum (La) and cerium (Ce). In formula (I), for the sake of convenience, the compositional ratio of O (oxygen) is indicated as 2, but this value need not be strictly understood, it being possible to tolerate some fluctuation in the composition (typically including the range of 1.95 or more and 2.05 or less).

Also, use can be made of, for example, so-called solid solution-type lithium-rich transition metal oxides of the general formula $xLi[Li_{1/3}Mn_{2/3}]O_2 \cdot (1-x)LiMeO_2$. In this general formula, "Me" is one, two or more transition metal, and x is a real number that satisfies the condition 0<x≤1.

Such oxides may be prepared by a hitherto known method. To give a specific example, first, starting compounds (e.g., a lithium source and a transition metal element source) that have been selected according to the target composition of the positive electrode active material are mixed in a predetermined ratio, and the resulting mixture is fired by an appropriate technique. The fired product is then suitably subjected to size reduction, granulation and classification, thereby preparing the desired oxide. Although the properties of this compound are not particularly limited, the compound may be rendered into a particulate (powder) form having a particle size of 20 μm or less (typically, from 0.1 to 20 μm, such as from 1 to 15 μm, and preferably from 3 to 10 μm). The specific surface area may be set to at least 0.1 $m^2/g$ (typically, at least 0.5 $m^2/g$, such as at least 1 $m^2/g$) and not more than 30 $m^2/g$ (typically not more than 20 $m^2/g$, such as not more than 10 $m^2/g$). In addition, the bulk density may be set to from 1 to 4 $g/cm^3$ (typically, from 1.5 to 3 $g/cm^3$, and preferably from 1.8 to 2.4 $g/cm^3$). By using a compound which satisfies one, two or more of the above properties (particle size, specific surface area, bulk density), a positive electrode active material layer that is dense and has a high conductivity can be formed. Moreover, suitable voids are retained within the positive electrode active material layer formed using such a compound, thereby enabling the resistance within the positive electrode active material layer to be kept even lower.

In this specification, unless noted otherwise, "particle size" refers to the particle diameter corresponding to 50% of the cumulative curve (also referred to as the "$D_{50}$ particle diameter" or the "median diameter") from the fine particle side in the volume-basis particle size distribution measured by particle size distribution measurement using an ordinary laser diffraction scattering method. Also, in this specification, "specific surface area" refers to the specific surface area (BET specific surface area) measured by a BET method (e.g., the BET single-point method) using nitrogen gas. Moreover, in this specification, "bulk density" refers to the value measured by the method defined in JIS K1469 (2003).

Conductive Material

The conductive materials disclosed herein include a lithium phosphate compound coated on at least part of the surface thereof with a conductive carbon (carbon-coated lithium phosphate compound). The lithium phosphate compound has a high theoretical capacity in the low SOC region of the lithium-transition metal composite oxide (e.g., near 3.5 V (vs. $Li/Li^+$)), yet it has a low ionic conductivity or electronic conductivity and tends to have a high resistance. Hence, in the arrangement disclosed herein, the surface of the compound is coated with conductive carbon, thereby forming a low-resistance material which is used as the conductive material. In batteries which use this compound as the conductive material, higher battery performance (e.g., high energy density, and charge/discharge operation in a broader SOC range) can be achieved.

Lithium Phosphate Compound

The lithium phosphate compound is a polyanion-type (e.g., olivine structure) phosphate salt of the general formula $LiMPO_4$ which includes, as constituent metal elements, lithium and at least one transition metal element. In this general formula, M is at least one transition metal element, and may be one or more element selected from among, e.g., Mn, Fe, CO, Ni, Mg, Zn, Cr, Ti and V. One, two or more such phosphate salts that have hitherto been used in nonaqueous electrolyte secondary batteries may be used without particular limitation as this phosphate salt. Illustrative examples include lithium iron phosphate ($LiFePO_4$), lithium manganese phosphate ($LiMnPO_4$) and lithium nickel phosphate ($LiNiPO_4$). Of these, it is preferable to include lithium iron phosphate. Because of the strong bonds between phosphorus and oxygen, lithium iron phosphate has a crystal structure that does not readily break down, and thus has an excellent safety. Also, compared with other compounds, it is relatively inexpensive, and thus preferable.

Lithium phosphate compound particles (powder) prepared by a known method may be used directly without modification as such a lithium phosphate compound. The properties of the particles are not particularly limited, although the particle size of primary particles is preferably in the range of 10 to 500 nm (preferably, 50 to 200 nm). By setting the primary particle size to 500 nm or less, a broad surface area of contact between the positive electrode active material and the carbon-coated lithium phosphate compound (which includes such as a lithium phosphate compound) can be ensured, enabling good conductive paths to be formed within the positive electrode active material layer. Also, by setting the primary particle size to 10 nm or more, wide conductive paths can be formed between particles of the positive electrode active material. In addition, conductive carbon can be suitably coated on the surface of the compound, enabling the electrical conductivity of the carbon-coated lithium phosphate compound to be made even better. In this specification, "particle size of primary particles (primary particle size)" refers to the arithmetic average of the particle sizes, resulting from examining 30 or more (e.g., from 30 to 100) primary particles in an electron micrograph (use may be made of either a scanning or transmission electron microscope, although the use of a transmission electron microscope is preferred). From the standpoint of the energy density, the bulk density of the particles is preferably in the range of 3 to 4 $g/cm^3$ (typically, from 3.4 to 3.8 $g/cm^3$).

Conductive Carbon

The conductive carbon that is coated onto the surface of the lithium phosphate compound may be, without particular limitation, one, two or more selected from among conductive carbons such as various types of carbon blacks (e.g., acetylene black, furnace black, ketjen black, channel black, lamp black, thermal black), coke, activated carbon, graphite (natural graphite and natural graphite that has been modified, synthetic graphite), carbon fibers (PAN-based carbon fibers, pitch-based carbon fibers), carbon nanotubes, fullerenes and graphenes. Of these, preferred use can be made of highly conductive carbon blacks (typically, acetylene black).

The properties of such a conductive carbon are not particularly limited, although it is preferable for the conductive carbon to have a smaller particle size than that of the lithium phosphate compound onto which the carbon is to be coated. In addition, because a smaller primary particle size results in a larger specific surface area and a greater surface area of contact with the lithium phosphate compound, this is advantageous for enhancing the ionic conductivity or the electronic conductivity of the compound. On the other hand, because conductive materials having a large specific surface area tend to become bulky, there is a risk that this will lower the energy density. For this reason, it is preferable for the particle size of the primary particles making up the conductive carbon to be in the range of from about 1 to about 200 nm (typically, from about 10 to 100 nm, such as from about 30 to 50 nm). Also it is preferable for the specific surface area to be in the range of from 25 to 1,000 $m^2/g$ (typically, from 50 to 500 $m^2/g$, such as from 50 to 200 $m^2/g$, and preferably from 50 to 100 $m^2/g$). In addition, it is preferable for the bulk density to be in the range of from 0.01 to 0.5 $g/cm^3$ (typically, from 0.05 to 0.3 $g/cm^3$, such as from 0.05 to 0.2 $g/cm^3$). By setting these properties in the foregoing ranges, the conductivity of the lithium phosphate compound can be suitably increased and a high energy density can be achieved.

From the standpoint of conductivity, the conductive carbon preferably has a chain-like or tasseled structure in which the primary particles are linked together to a certain degree. The linking together of primary particles is also referred to as "a structure," and the extent to which such structures have developed can be determined by electron microscopy (either a scanning or transmission electron microscope may be used, with a scanning electron microscope being preferred). Because a conductive carbon having a structure in which the primary particles are linked together is able to form conductive paths between particles of the positive electrode active material while suppressing the electrical resistance of the lithium phosphate compound, a smaller amount can confer an excellent conductivity. On the other hand, such structures have a tendency to get tangled or to curl up, thus making uniform dispersion difficult to achieve. For these reasons, the diameter of primary structures (also referred to as the "aggregate diameter") of the fine particles of conductive carbon is preferably in the range of about 100 to 1,000 nm, and more preferably in the range of 200 to 800 nm.

Also, from the standpoint of the affinity between the binder and the nonaqueous solvent, etc., it is preferable for the conductive carbon to have a dibutyl phthalate (DBP) adsorption of from 50 to 500 mL/100 g (and preferably from 100 to 200 mL/100 g). In this range, ability to bond with the binder is excellent and robust conductive paths can be formed within the positive electrode active material layer. In addition, because the affinity with the nonaqueous solvent is excellent, the electrical resistance within the positive electrode active material layer can be reduced even further. In this specification, "DBP absorption" refers to a measured quantity obtained by the method of measurement specified in Method A or B of JIS K-6217-4.

Preferred use can be made of a conductive carbon which satisfies one, two or more of the above-described preferred properties (particle size of primary particles, specific surface area, bulk density, degree of development of structures, DBP absorption). Such conductive carbon is exemplified by various types of carbon black (e.g., acetylene black). Some correlation is observable among the above properties. For example, the degree to which structures have developed can for the most part be understood also from the DBP absorption and the bulk density.

Production of Carbon-Coated Lithium Phosphate Compound

No particular limitation is imposed on the method of producing the carbon-coated lithium phosphate compound, i.e., the method of coating conductive carbon on at least part of the surface of the lithium phosphate compound. A known method may be suitably used for this purpose. An example of a preferred embodiment is mechanochemical treatment.

"Mechanochemical treatment" refers to treatment in which the materials are physically (mechanically) bonded to each other by applying mechanical energy, such as compressive, shear or frictional forces, to a material in the form of a powder (fine particles). Specifically, the carbon-coated lithium phosphate compound can be produced by charging into a suitable mixer a lithium phosphate compound and conductive carbon which have been measured out in a specific ratio, and carrying out mechanochemical treatment under given treatment conditions. One, two or more grinding and mixing apparatuses that have hitherto been used (e.g., jet mill, planetary mixer, homogenizer, dispersion mixer, ball mill, bead mill) may be utilized without particular limitation in such treatment. By suitably adjusting the treatment conditions (e.g., output strength of the treatment apparatus and treatment time), it is possible to obtain a carbon-coated lithium phosphate compound of the desired form (particle size, shape). Specifically, from 1 minute to 30 minutes (e.g., from 5 minutes to 15 minutes) of mechanochemical treatment at an output of from 0.1 kW to 5 kW (e.g., 1 kW to 3 kW) can be carried out using, for example, a NOB-MINI powder processor available from Hosokawa Micron Group. This enables destruction of the crystal structure of the lithium phosphate compound by the mechanical energy of the apparatus to be suppressed and conductive carbon to be suitably coated onto the surface of the lithium phosphate compound.

Production of the carbon-coated lithium phosphate compound may also be carried out by applying a starting material for the conductive carbon to the surface of the lithium phosphate compound to be coated and carbonizing this starting material. More specifically, suitable use can be made of already known methods, including vapor phase methods such as chemical vapor deposition (CVD) in which a vapor-phase coat starting material is deposited, within an inert gas atmosphere, onto the surface of a lithium phosphate compound as the material to be coated; and a liquid phase method in which the lithium phosphate compound as the material to be coated and the conductive carbon starting material are mixed together in a suitable solvent, following which the conductive carbon starting material is fired and carbonized in an inert gas atmosphere.

The conductive carbon starting material may be any of various materials that are capable of forming conductive carbon by carbonization. Various hydrocarbon compounds (in gaseous form), including unsaturated aliphatic hydrocarbons such as ethylene, acetylene and propylene; saturated aliphatic hydrocarbons such as methane, ethane and propane; and aromatic hydrocarbons such as benzene, toluene and naphthalene may be used as the conductive carbon starting material in chemical vapor deposition. These compounds may be used singly or as a mixed gas of two or more types thereof. The temperature, pressure, time and other conditions in chemical vapor deposition treatment may be suitably selected according to the type of starting material to be used. Conductive carbon starting materials that may be used in the liquid phase method include aromatic hydrocarbons such as naphthalene and anthracene, and pitches such as coal tar pitch, petroleum pitch and wood tar pitch. These may be used singly or two or more may be used in combination. The carbonization (firing) temperature and time may be suitably selected according to the type of starting material used. Firing should typically be carried out in the temperature range of from about 800 to 1,600° C. for a period of about 2 to 3 hours.

It is possible to determine whether conductive carbon is coated on the surface of a lithium phosphate compound by examining at least five particles (e.g., from 10 to 20 particles, and typically 10 particles) using, for example, conventional scanning electron microscope (SEM)-energy dispersive x-ray spectroscopy (EDX). More specifically, by examining the lithium phosphate compound or a material containing the lithium phosphate compound with a scanning electron microscope and analyzing by energy dispersive x-ray spectroscopy the resulting SEM image (e.g., mapping the transition metal elements included only in the lithium phosphate compound), it is possible to determine the degree of coating by conductive carbon.

In a preferred embodiment disclosed herein, the coating amount of the conductive carbon per 100 parts by mass of the lithium phosphate compound is from 40 parts by mass to 80 parts by mass (preferably form 50 parts by mass to 70 parts by mass). By setting the coating amount to 40 parts by mass or more, a high conductivity can be imparted to the lithium phosphate compound, enabling it to be advantageously used as a conductive material. Moreover, as noted above, because conductive carbon has a low bulk density compared with the lithium phosphate compound, by setting the coating amount to 80 parts by mass or less, it is possible to keep the bulk density of the carbon-coated lithium phosphate compound from decreasing excessively, enabling a higher density to be achieved in the positive electrode active material layer.

The particle size of the carbon-coated lithium phosphate compound is preferably smaller than that of the above-described positive electrode active material. More specifically, the volume-basis average particle size ($D_{50}$), as determined by the particle size distribution measured using a laser diffraction scattering method, is preferably not more than 10 µm (typically from 0.01 to 5 µm, such as from 0.05 to 1 µm, and preferably from 0.05 to 0.5 µm). By setting the particle size such that conductive material≤positive electrode active material (preferably conductive material<positive electrode active material), suitable conductive paths can be formed between the particles of the positive electrode active material. Hence, the resistance of the positive electrode active material layer can be reduced, enabling a higher battery performance to be achieved.

In a preferred embodiment, letting the amount of the conductive material overall be 100% by mass, the carbon-coated lithium phosphate compound accounts for a proportion of the conductive material which is from 20% by mass to 70% by mass (preferably from 50% by mass to 70% by mass, and more preferably from 60% by mass to 70% by mass). Substances that differ in type from this carbon-coated lithium phosphate compound may also be included as a conductive material in the positive electrode active material layer. One, two or more substances (typically, carbon materials) from among those that have hitherto been used as conductive materials in nonaqueous electrolyte secondary batteries may be used without particular limitation as such substances. More specifically, use can be made of the substances mentioned above as the conductive carbon to be coated onto the surface of the lithium phosphate compound; of these, preferred use can be made of carbon black (typically, acetylene black). When two or more conductive materials are used together, even better conductive paths can be formed within the positive electrode active material layer owing to synergistic effects between the carbon-coated lithium phosphate compound and the other conductive materials (e.g., carbon black). For example, by using two or more types of conductive materials having different particle sizes (e.g., carbon-coated lithium phosphate compound and carbon black), conductive material can be suitably packed into the gaps between the positive electrode active material particles (e.g., after large voids have been filled with the conductive material having a large particle size, the finer conductive material makes its way into smaller gaps). Therefore, even more robust conductive paths can be formed within the positive electrode active material layer, enabling a high battery performance (e.g., high power density) to be achieved.

Binder

The positive electrode active material layer disclosed herein may include, if necessary, optional ingredients other than the positive electrode active material and the conductive material. Such optional ingredients are exemplified by binders. Binders that may be used include polymers which are capable of dissolving or dispersing in the solvent used. For example, in a positive electrode mixture composition that uses an aqueous solvent, preferred use can be made of cellulose-based polymers such as carboxymethyl cellulose (CMC; typically, the sodium salt) and hydroxypropylmethyl cellulose (HPMC); polyvinyl alcohol (PVA) and fluoroplastics such as polytetrafluoroethylene (PTFE); and rubbers such as styrene-butadiene rubber (SBR). In positive electrode mixture compositions which use a nonaqueous solvent, the use of polyvinylidene fluoride (PVdF), polyvinylidene chloride (PVdC) and polyethylene oxide (PEO) is preferred.

It is suitable to set the amount of the positive electrode active material as proportion of the overall positive electrode active material layer to at least about 70% by mass (typically from 70% by mass to 95% by mass), and generally preferable for this to be at least about 80% by mass (typically from 80% by mass to 95% by mass, such as from 85% by mass to 95% by mass). Also, it is suitable to set the amount of the positive electrode active material as a proportion of the overall positive electrode active material layer to not more than 10% by mass (typically from 1% by mass to 10% by mass), and generally not more than about 7% by mass (typically from 2% by mass to 7% by mass). Within the above range, a high energy density can be achieved. For example, the amount of carbon-coated lithium phosphate compound included as the conductive material, as a proportion of the overall positive electrode active material layer, may be set to about 7% by mass or less (typically from 1% by mass to 7% by mass), and it is generally preferable for this to be 5% by mass or less (typically from 1% by mass to 3.5% by mass, such as from 2.5% by mass to 3.5% by mass). Also, for example, the amount of carbon black (typically acetylene black) included as the conductive material, as a proportion of the overall positive electrode active material layer, may be set to about 7% by mass or less (typically from 1% by mass to 7% by mass), and it is generally preferable for this to be about 5% by mass or less (typically from 1% by mass to 5% by mass, such as from 2% by mass to 5% by mass). Within the above range, it is possible to achieve both a high energy density and a high power density. Moreover, in cases where a binder is used, the amount of binder included, as a proportion of the overall positive electrode active material layer, may be set to, for example, from about 0.5% by mass to about 10% by mass, and it is general preferably for this to be set to from about 1% by mass to about 5% by mass.

It is suitable for the mass of the positive electrode active material layer provided per unit surface area of the positive electrode current collector (total mass on both sides in a construction having a positive electrode active material layer on each side of the positive electrode current collector) to be set to, for example, from 5 to 40 mg/cm$^2$ (typically from 10 to 20 mg/cm$^2$). It is generally preferable for the mass of the positive electrode active material layer provided on each side of the positive electrode current collector to be about the same. Also, after drying of the positive electrode active material slurry, the thickness, density and porosity of the positive electrode active material layer can be adjusted by carrying out a suitable pressing treatment (use can be made of any of various types of hitherto known pressing techniques, such as roll pressing or flat-plate pressing). The density of the positive electrode active material layer may be set to, for example, from about 1.5 to about 4 g/cm$^3$ (typically from 1.8 to 3 g/cm$^3$). By setting the density in this range, the lithium ion diffusion resistance can be kept low while maintaining the desired capacity. This makes it possible to achieve both a high energy density and a high power density.

Various additives (e.g., inorganic compounds that can generate a gas during overcharging, and materials capable of functioning as dispersants) may be optionally added to the composition prepared here, insofar as doing so does not detract from the advantageous effects of the invention. Exemplary compounds that can generate a gas during overcharging include carbonates (e.g., lithium carbonate). Exemplary dispersants include polymeric compounds having hydrophobic chains and hydrophilic groups (e.g., alkali salts, typically sodium salts); anionic compounds such as sulfates, sulfonates and phosphates; and cationic compounds such as amines.

Negative Electrode

The negative electrode disclosed here has a negative electrode current collector and, formed on the negative electrode current collector, a negative electrode active material layer which includes at least a negative electrode active material. Such a negative electrode can be preferably produced by applying, onto a negative electrode current collector made of an elongated metal foil, a paste-like or slurry-like composition (negative electrode active material slurry) obtained by dispersing a negative electrode active material and, if necessary, a binder in a suitable solvent, and then drying the slurry to form a negative electrode active material layer. A conductive material made of a metal having a good conductivity (e.g., copper, nickel, titanium, stainless steel) may be advantageously used as the negative electrode current collector. Either an aqueous solvent or an organic solvent may be used as the solvent. For example, water may be used.

Negative Electrode Active Material

One, two or more materials that have hitherto been used in nonaqueous electrolyte secondary batteries may be used without particular limitation as the negative electrode active material. Although not particularly limited, use can be made of, for example, carbon materials such as natural graphite (plumbago), synthetic graphite, hard carbon (non-graphitizable carbon), soft carbon (graphitizable carbon) and carbon nanotubes; metal oxide materials such as silicon oxide, titanium oxide, vanadium oxide, iron oxide, cobalt oxide, nickel oxide, niobium oxide, tin oxide, lithium silicon composite oxides, lithium titanium composite oxides (LTO; e.g., $Li_4Ti_5O_{12}$, $LiTi_2O_4$, $Li_2Ti_3O_7$), lithium vanadium composite oxides, lithium manganese composite oxides and lithium tin composite oxides; metal nitride materials such as lithium nitride, lithium cobalt composite nitrides and lithium nickel composite nitrides; and metal materials made of a metal such as tin, silicon, aluminum, zinc or lithium, or a metal alloy composed primarily of these metallic elements. Of these, preferred use can be made of a graphite-based carbon material (typically graphite) that is capable of achieving a high energy density.

The binder may be a suitable material selected from among the polymer materials listed above as binders for the positive electrode active material layer. Illustrative examples include styrene-butadiene rubber (SBR), polyvinylene fluoride (PVdF) and polytetrafluoroethylene (PTFE). In addition, various additives such as dispersants and conductive materials may also be suitably used.

It is suitable to have the negative electrode active material account for a proportion of the overall negative electrode active material layer which is at least about 50% by mass, and preferably from 90% by mass to 99% by mass (e.g., from 95% by mass to 99% by mass). When a binder is used, it is suitable to have the binder account for a proportion of the overall negative electrode active material which is from about 1% by mass to about 10% by mass, and generally from about 1% by mass to about 5% by mass.

It is suitable for the mass of the negative electrode active material layer provided per unit surface area of the negative electrode current collector (total mass on both sides in a construction having a negative electrode active material layer on each side of the negative electrode current collector) to be set to, for example, from about 5 to about 20 mg/cm$^2$ (typically from 5 to 10 mg/cm$^2$). It is generally preferable for the mass of the negative electrode active material layer provided on each side of the negative electrode current collector to be about the same. Also, after drying of the negative electrode active material slurry, the thickness, density and porosity of the negative electrode active material layer can be adjusted by carrying out a suitable pressing treatment (use can be made of any of various types of hitherto known pressing techniques, such as roll pressing or flat-plate pressing). The density of the negative electrode active material layer may be set to, for example, from about 0.5 to 2 g/cm$^3$ (typically from 1 to 1.5 g/cm$^3$). By setting the density of the negative electrode active material layer in this range, the interface with the nonaqueous electrolyte is well maintained, and a high durability (cycle characteristics) and a high power density can both be achieved.

Electrode Assembly

The electrode assembly has a construction in which the positive electrode and negative electrodes are stacked together. In a typical construction of the nonaqueous electrolyte secondary battery disclosed herein, a separator is interposed between the positive electrode and the negative electrode. Any of various types of porous sheets or the like similar to the separators in ordinary nonaqueous electrolyte secondary batteries may be used as the separator. Preferred examples include porous resin sheets (films, nonwoven fabric, etc.) made up a resin such as polyethylene (PE), polypropylene (PP), polyester, cellulose or polyamide. These porous resin sheets may have a single-layer structure or a multilayer structure of two or more layers (e.g., a trilayer structure consisting of PP layers stacked on either side of a PE layer). It is preferable for the thickness of the porous resin sheet to be, for example, from about 10 to 40 µm. Preferred use can be made of a porous resin sheet having a porosity (void ratio) of from about 20 to 90 vol % (typically from 30 to 80 vol %, such as from 35 to 70 vol %). In this specification, "porosity" refers to the value calculated by dividing the pore volume (cm$^3$) obtained by the above-described measurement by the apparent volume (cm$^3$), then multiplying by 100.

Although not subject to any particular limitation, it is generally suitable for the ratio $C_a/C_c$ of the negative electrode capacity $C_a$ (mAh), calculated as the product of the theoretical capacity (mAh/g) per unit mass of the negative electrode active material and the mass (g) of the negative electrode active material, to the positive electrode capacity $C_c$, (mAh), calculated as the product of the theoretical capacity (mAh/g) per unit mass of the positive electrode active material and the mass (g) of the positive electrode active material, to be set to, for example, from 1.0 to 2.0, and preferably from 1.2 to 1.9 (e.g., from 1.7 to 1.9). The ratio of the capacities of the positive electrode and the negative electrode which face each other directly influences the battery capacity (or irreversible capacity) and energy density, and, depending on factors such as the conditions of battery use (e.g., high-speed charging), tends to invite lithium deposition. By setting the capacity ratio of the mutually facing positive and negative electrodes in the above range, the deposition of lithium can be suitably suppressed while maintaining battery performance such as battery capacity and energy density at a good level.

Nonaqueous Electrolyte

The nonaqueous electrolyte used is typically one obtained by dissolving or dispersing a supporting salt (in a lithium ion secondary battery, the supporting salt is a lithium salt) in a nonaqueous solvent. A supporting salt similar to those used in conventional nonaqueous electrolyte secondary batteries may be suitably selected and used here as the supporting salt. Illustrative examples of lithium salts include $LiPF_6$, $LiBF_4$, $LiClO_4$, $LiAsF_6$, $Li(CF_3SO_2)_2N$ and $LiCF_3SO_3$. Such supporting salts may be used singly or two or more may be used in combination. An example of an especially preferred supporting salt is $LiPF_6$. It is preferable for the nonaqueous electrolyte to be prepared so that the concentration of the supporting salt is in the range of from 0.7 mol/L to 1.3 mol/L.

Various organic solvents, such as carbonates, ethers, esters, nitriles, sulfones and lactones, that are used in the electrolyte solutions of conventional nonaqueous electrolyte secondary batteries may be used here without particular limitation as the nonaqueous solvent. Illustrative examples include ethylene carbonate (EC), propylene carbonate (PC), diethyl carbonate (DEC), dimethyl carbonate (DMC), ethyl methyl carbonate (EMC), vinylene carbonate (VC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane and γ-butyrolactone. As used herein, the term "carbonates" includes cyclic carbonates and acyclic carbonates, and the term "ethers" include cyclic ethers and acyclic ethers. These nonaqueous solvents may be used singly or two or more may be used in a suitable combination.

In a preferred embodiment, use may be made of a nonaqueous solvent composed primarily of a carbonate. Cases in which such a nonaqueous solvent is included in the electrolyte solution are preferred because a good film can form on the surface of the negative electrode active material during charging (typically, during initial charging). Of these, preferred use can be made of EC, which has a high relative dielectric constant, and DMC and EMC which have high oxidation potentials (broad potential windows). For example, preferred use can be made of a nonaqueous solvent containing one, two or more carbonates, with the total volume of these carbonates accounting for at least 60 vol % (more preferably at least 75 vol %, even more preferably at least 90 vol %, and even substantially 100 vol %) of the volume of the overall nonaqueous solvent.

After the battery has been built, other operations such as conditioning (initial charging/discharging), gas venting and quality inspection are suitably carried as needed.

Battery Case

The battery case may make use of a material and a shape that have hitherto been used in nonaqueous electrolyte secondary batteries. Illustrative examples of materials that may be used include metallic materials such as aluminum and steel, and plastic materials such as polyphenylene sulfide resins and polyimide resins. Of these, to enhance heat dissipation and increase energy density, preferred use can be made of a relatively lightweight metal (e.g., aluminum or an aluminum alloy). The shape of the battery case (outside shape of the container) is exemplified by circular shapes (cylindrical shapes, coin shapes, button shapes), hexahedral shapes (cuboidal shapes, cubic shapes), pouch shapes, and other shapes obtained by working and altering the foregoing shapes. Techniques similar to those used in conventional nonaqueous electrolyte secondary batteries may be suitably used to seal the battery case. In addition, the battery case may also be provided with a safety mechanism such as a current interrupt device (a device which, when overcharging of the battery occurs, interrupts the flow of current in response to a rise in internal pressure).

Charging treatment (conditioning treatment) is typically carried out under given conditions on the battery that has been built. In a preferred embodiment, after carrying out such charging treatment, aging treatment in which the battery is held (allowed to stand) under given conditions is administered in order to, for example, stabilize the battery performance. Where necessary, gas venting, quality inspection and other operations may also be carried out.

Figure 2:
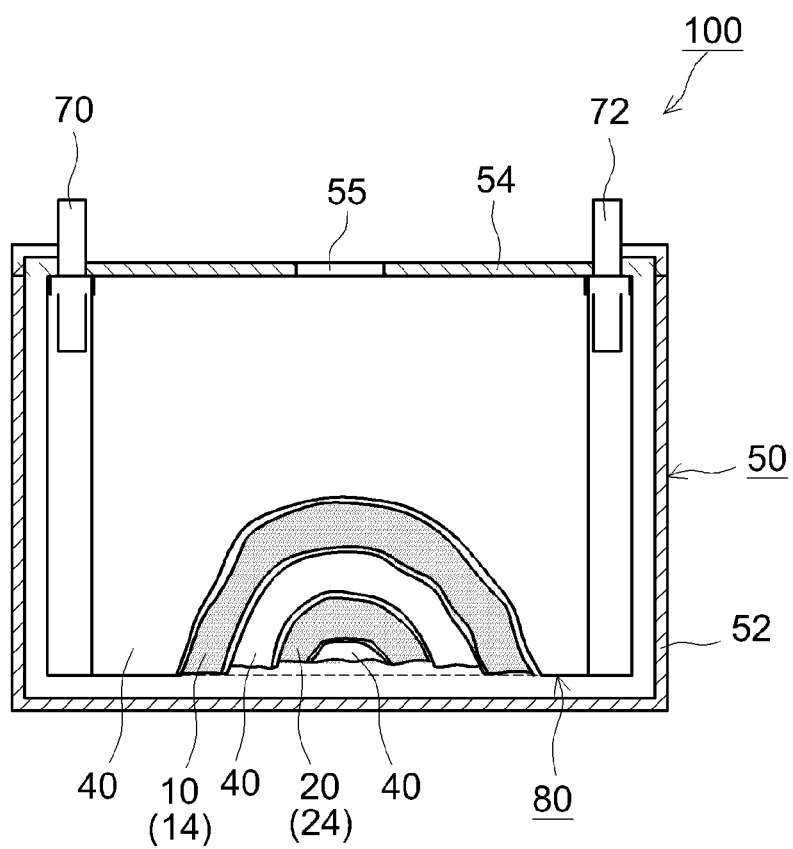
FIG. 2 is a cross-sectional view of the nonaqueous electrolyte secondary battery in FIG. 1, taken along line II-II.
Figure 3:
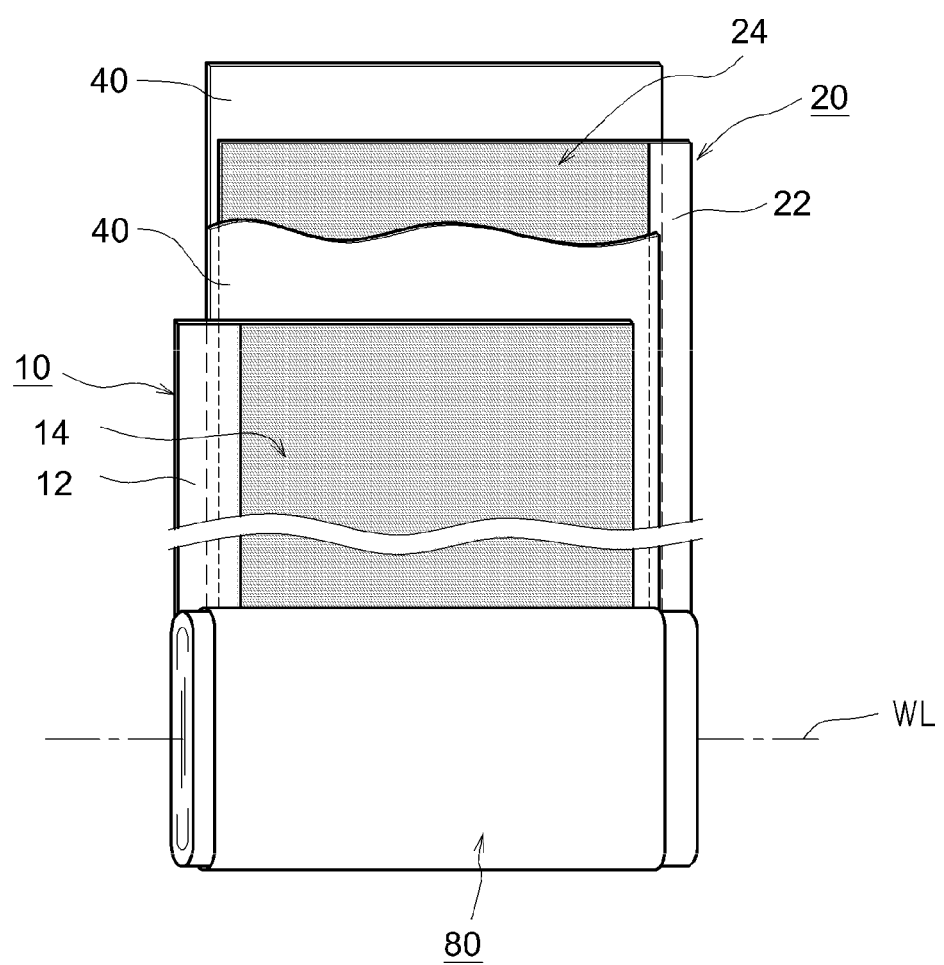
FIG. 3 is a schematic view showing the construction of a wound electrode assembly in a nonaqueous electrolyte secondary battery according to an embodiment of the invention.

Although not intended to be particularly limitative, FIGS. 1 to 3 show the simplified construction of a nonaqueous electrolyte secondary battery according to one embodiment of the invention. In this example, the nonaqueous electrolyte secondary battery is in a form obtained by housing an electrode assembly that has been flatly wound (wound electrode assembly) and a nonaqueous electrolyte within a flat cuboidal (box-shaped) container. In the diagrams described below, members or features having like functions are designated by like symbols, and repeated explanations may be omitted or simplified. Relative dimensions (length, width, thickness, etc.) of features shown in the diagrams may not be true to scale.

As shown in FIG. 1, the battery case 50 of a nonaqueous electrolyte secondary battery 100 includes a battery case body 52 that is open at the top end and has a flattened cuboidal shape, and a lid 54 which closes the opening in the case body 52. The lid 54 is equipped with a positive electrode terminal 70 that connects electrically to the positive electrode and a negative electrode terminal 72 that connects electrically to the negative electrode. The top side of the battery case 50 (i.e., the lid 54) is equipped with a safety valve 55 for discharging, to the exterior of the battery case, gases that have formed at the interior of the case.

As shown in FIG. 2, an electrode assembly 80 in a form obtained by flatly winding an elongated positive electrode sheet 10 and an elongated negative electrode sheet 20 together with an elongated separator sheet 40 therebetween (wound electrode assembly) is housed, together with a nonaqueous electrolyte solution (not shown), at the interior of the battery case 50.

FIG. 3 is a diagram schematically showing the elongated sheet structures (electrode sheets) at the stage prior to assembly of the wound electrode assembly 80. The wound electrode assembly 80 has been formed into a flattened shape by placing over one another and winding together a positive electrode sheet 10 in which a positive electrode active material layer 14 has been formed in the lengthwise direction on one or both sides (typically both sides) of an elongated positive electrode current collector 12 and a negative electrode sheet 20 in which a negative electrode active material layer 24 has been formed in the lengthwise direction on one or both sides (typically both sides) of an elongated negative electrode current collector 22, then pressing and squashing the resulting wound body from a direction perpendicular to the winding axis WL. In addition, insulating layers have been placed between the positive electrode active material layer 14 and the negative electrode active material layer 24 to prevent direct contact therebetween. In the example shown here, separators 40 in the shape of elongated sheets are used as the insulating layers when manufacturing the wound electrode assembly 80.

The positive electrode sheet 10 is formed in such a way that the positive electrode active material layer 14 is not provided along (or has been removed from) one edge portion thereof in the lengthwise direction, leaving the positive electrode current collector 12 exposed. Likewise, the negative electrode sheet 20 is formed in such a way that the negative electrode active material layer 24 is not provided along (or has been removed from) one edge portion thereof in the lengthwise direction, leaving the negative electrode current collector 22 exposed. Also, a positive electrode current-collecting plate is provided on the exposed edge of the positive electrode current collector 12 and a negative electrode current-collecting plate is provided on the exposed edge of the negative electrode current collector 22, and these are electrically connected to, respectively, the positive electrode terminal 70 (FIG. 2) and the negative electrode terminal 72 (FIG. 2).

In addition, the invention provides a battery pack which combines a plurality of the nonaqueous electrolyte secondary batteries (cells) disclosed herein. In a battery pack in which a plurality of cells are connected to each other (typically, in series), the performance of the battery pack as a whole may be governed by the cell having the lowest performance. Because the nonaqueous electrolyte secondary battery disclosed herein, compared with conventional batteries, has a high battery utilization and an energy density or power density that is excellent, it is capable of exhibiting an even high battery performance as a battery pack.

The nonaqueous electrolyte secondary battery disclosed herein (typically, a lithium ion secondary battery) can be utilized in various applications, and is characterized by having an excellent battery performance (e.g., initial capacity and power density) compared with conventional nonaqueous electrolyte secondary batteries. Hence, by utilizing such qualities, the inventive battery can be advantageously used as an on-board power source for vehicle propulsion. The vehicle is typically an automobile and may be, for example, a hybrid vehicle (HV), a plug-in hybrid vehicle (PHV), an electric vehicle (EV), a fuel cell vehicle, an electric-powered wheelchair or a power-assisted bicycle. Accordingly, vehicles equipped with any of the nonaqueous electrolyte secondary batteries disclosed herein (preferably as the power source) are provided. Moreover, these vehicles may be such that a plurality of the nonaqueous electrolyte secondary batteries is provided in the form of a battery pack wherein they are typically connected in series.

Examples of the invention are described below, although these examples are not intended to limit the invention in any way.

First, LiFePO$_4$ (olivine structure; particle size of primary particles, 50 to 200 nm; BET specific surface area, 10 m$^2$/g; bulk density, 3.6 g/cm$^3$) as the lithium phosphate compound and acetylene black (particle size of primary particles, 30 to 50 nm) were weighed out in a mass ratio of 100:40, and a lithium phosphate compound having conductive carbon (acetylene black) coated on the surface (carbon-coated lithium phosphate compound) was produced by mechanofusion. The volume-basis average particle diameter of this carbon-coated lithium phosphate compound, as determined using a laser diffraction scattering method, was about 0.8 μm.

Next, a slurry-type composition to be used in forming the positive electrode active material layer (positive electrode active material slurry) was prepared by weighing out LiNi$_{1/3}$Co$_{1/3}$Mn$_{1/3}$O$_2$ (layered structure, particle diameter of secondary particles, 5 μm) as the positive electrode active material, a conductive material, and polyvinylidene fluoride (PVdF) as the binder in a mass ratio of 90:5:5, and mixing these ingredients with N-methylpyrrolidone (NMP) to a solids concentration of about 50% by mass. Here, acetylene black (AB, particle size of primary particles, 30 to 50 nm) and carbon-coated lithium phosphate compound (also abbreviated below as "CB-LFP") were each mixed in the mass ratios shown in Table 1 and used as the conductive material. This positive electrode active material slurry was roll-coated to a grammage of 20 mg/cm$^2$ (solids basis) as a strip onto either side of an elongated aluminum foil (positive electrode current collector) having a thickness of about 20 μm and dried, thus producing a positive electrode in which a positive electrode active material layer was provided on each side of the positive electrode current collector (Examples 1 to 10). This was pressed using a roll press, thereby adjusting the thickness to 130 μm and the electrode density to 2.8 g/cm$^3$.

Next, a slurry-type composition to be used in forming the negative electrode active material layer (negative electrode active material slurry) was prepared by weighing out natural graphite powder (average particle size, 5 μm; specific surface area, 3 m$^2$/g) as the negative electrode active material, styrene-butadiene rubber (SBR) as the binder, and carboxymethyl cellulose (CMC) as the thickener in a mass ratio therebetween of 98:1:1, and mixing these ingredients with deionized water to a solids concentration of about 45% by mass. This negative electrode active material slurry was roll-coated to a grammage of 14 mg/cm$^2$ (solids basis) as a strip onto either side of an elongated copper foil (negative electrode current collector) having a thickness of about 20 μm and dried, thus producing a negative electrode in which a negative electrode active material layer was provided on one side of the negative electrode current collector. This was pressed using a roll press, thereby adjusting the thickness to 100 μm and the electrode density to 1.4 g/cm$^3$.

An electrode assembly was fabricated by arranging the positive electrode and negative electrode produced above so as to face each other, with a separator (the separator used here had a trilayer structure consisting of a layer of polypropylene (PP) on either side of a layer of polyethylene (PE), a thickness of 20 μm, and a porosity of 48 vol %) interposed therebetween. A positive terminal and a negative terminal were attached to, respectively, the positive electrode current collector exposed along one edge of the electrode assembly (positive electrode active material-uncoated region) and the negative electrode current collector exposed along the other edge of the electrode assembly (negative electrode active material-uncoated region). This electrode was housed within a laminate film and was dried under reduced pressure and high pressure to remove moisture, following which a nonaqueous electrolyte (the nonaqueous electrolyte used here was obtained by dissolving LiPF$_6$ as the supporting salt to a concentration of 1 mol/L in a mixed solvent containing ethylene carbonate (EC) and diethyl carbonate (DEC) in a volumetric ratio of EC:DEC=40:60, then adding 2 wt % of biphenyl) was injected through an opening in the laminate film and the opening was sealed. This completed the construction of the nonaqueous electrolyte secondary batteries in these examples (Examples 1 to 10).

TABLE 1

| | Conductive material | | | Battery performance evaluation results | |
|---|---|---|---|---|---|
| | AB (% by mass) | CB-LFP (% by mass) | CB-LFP as proportion of conductive material | Energy density (mWh/g) | Power density (mW/g) |
| EX 1 | 5.0 | — | 0% | 522 | 54.8 |
| EX 2 | 4.0 | 1.0 | 20% | 530 | 78.2 |
| EX 3 | 3.5 | 1.5 | 30% | 532 | 84.2 |
| EX 4 | 3.0 | 2.0 | 40% | 535 | 91.1 |
| EX 5 | 2.5 | 2.5 | 50% | 537 | 99.2 |
| EX 6 | 2.0 | 3.0 | 60% | 539 | 108.9 |
| EX 7 | 1.5 | 3.5 | 70% | 542 | 103.8 |
| EX 8 | 1.0 | 4.0 | 80% | 544 | 44.1 |
| EX 9 | 0.5 | 4.5 | 90% | 546 | 33.5 |
| EX 10 | — | 5.0 | 100% | 548 | 31.6 |

Performance Evaluation

Energy Density:

Conditioning treatment at a temperature of 25° C. was carried out under the following charge-discharge pattern on the batteries obtained in Examples 1 to 10.
(1) Constant-current (CC) charging at 50 mA (1 C) until the battery voltage reached 4.1 V, followed by 3 hours of constant-voltage (CV) charging.
(2) 10 minutes at rest.
(3) CC discharging at 25 mA (½ C) down to a battery voltage of 3.0 V, followed by 10 minutes at rest.

The above operations were repeated for three cycles, and the discharge capacity in the third cycle (sum of the product of the current times the voltage) was treated as the battery capacity. The resultant battery capacity was divided by the mass of the positive electrode active material. The battery capacity per unit mass of the positive electrode active material is shown in the "Energy density" column of Table 1 and in FIG. 4.

Figure 4:
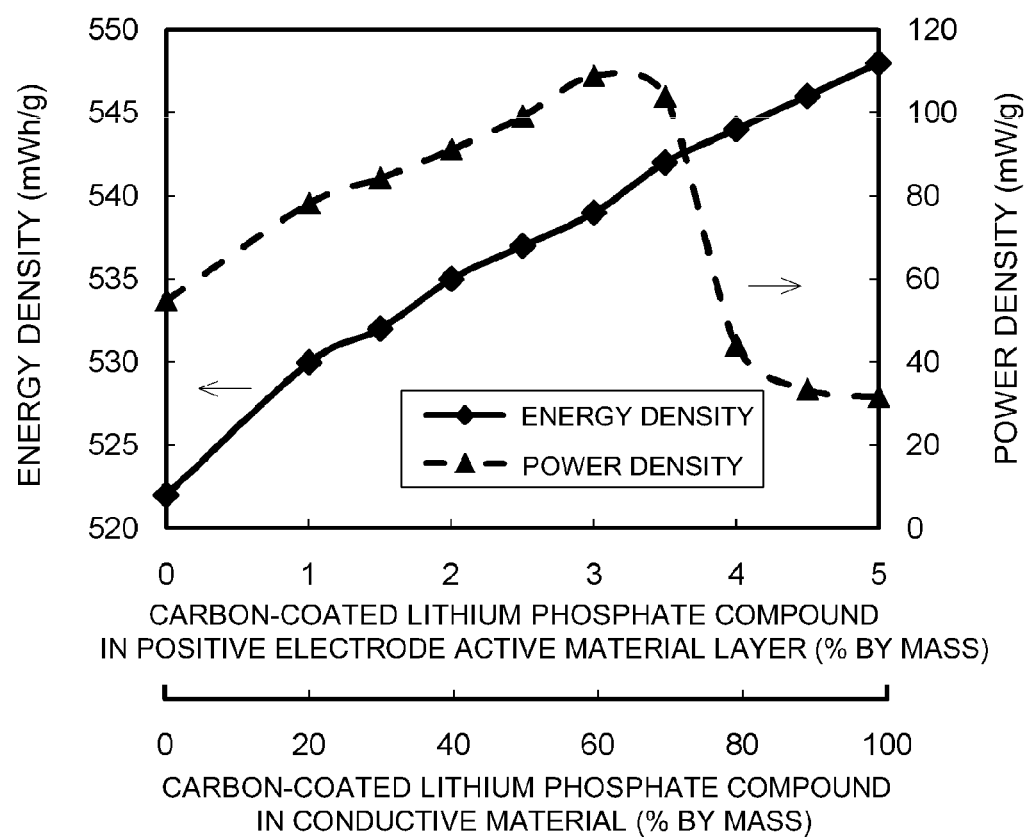
FIG. 4 is a graph of energy density (mWh/g) and power density (mW/g) versus lithium phosphate compound content (% by mass).

As is apparent from Table 1 and FIG. 4, compared with Example 1 in which a carbon-coated lithium phosphate compound was not used, in Examples 2 to 10 in which carbon-coated lithium phosphate compounds were used, the energy density rose as the proportion of carbon-coated lithium phosphate compound in the conductive material became higher. The reason is thought to be that the lithium phosphate compound induces charge-discharge reactions at a fixed voltage near 3.5 V (vs. Li/Li$^+$). In other words, this is because, compared with an ordinary conductive material (here, acetylene black), the lithium phosphate compound has a high theoretical capacity. It was thus demonstrated that a higher energy density can be achieved by including a carbon-coated lithium phosphate compound as the conductive material.

Power Density:

The IV resistances of the batteries obtained in Examples 1 to 10 were measured at a temperature of 25° C. First, the battery were charged to a battery voltage of 4.1 V at a constant current of 50 mA (1 C), following which constant-voltage charging was carried out for 3 hours, thereby placing the battery in a fully charged state. Next, the battery was left at rest for 3 hours, after which it was discharged at a constant current of 500 mA (10 C) and the IV resistance was determined from the voltage drop after 10 seconds. The power density is calculated from the resistance. The power density per unit mass of the positive electrode active material is shown in the "Power density" column in Table 1 and in FIG. 4.

As is apparent from Table 1 and FIG. 4, in Examples 2 to 7 in which the proportion of the overall conductive material accounted for by the carbon-coated lithium phosphate compound was set to from 20% by mass to 70% by mass, the power density increased. In Examples 5 to 7 in which the proportion of the overall conductive material accounted for by the carbon-coated lithium phosphate compound was set to from 50% by mass to 70% by mass, the rise in the power density was pronounced. The reason appears to be that synergistic effects arise from the mixture of two types of conductive materials (carbon-coated lithium phosphate compound and carbon black) in a suitable proportion. In Examples 8 to 10 in which the proportion of the overall conductive material accounted for by the carbon-coated lithium phosphate compound was set to from 80% by mass or more, the power density decreased. The reason is thought to be that conductive paths within the positive electrode active material layer could no longer be maintained on account of the decrease in the absolute amount of acetylene black having a high conductivity.

It was demonstrated from the above results that, by setting the proportion of the overall conductive material accounted for by the carbon-coated lithium phosphate compound to from 20% by mass to 70% by mass (that is, by setting the proportion of the positive electrode active material layer accounted for by the carbon-coated lithium phosphate compound to from 1% by mass to 3.5% by mass), a high energy density and a high power density can both achieved at the same time. More preferably, it was demonstrated that, by setting the proportion of the overall conductive material accounted for by the carbon-coated lithium phosphate compound to from 50% by mass to 70% by mass (that is, setting the proportion of the positive electrode active material layer accounted for by the carbon-coated lithium phosphate compound to from 2.5% by mass to 3.5% by mass), an even better power density can be exhibited. These results corroborate the technical significance of this invention.

The invention has been described in detail above, although it should be noted that these embodiments are provided only by way of illustration, many variations and modifications to these embodiments being encompassed by the invention disclosed herein.

INDUSTRIAL APPLICABILITY

The nonaqueous electrolyte secondary battery disclosed herein (typically, a lithium ion secondary battery) can be utilized in various applications. As described above, it has, for example, a high initial capacity and is able to exhibit an excellent power density even at a low state of charge. By taking full advantage such characteristics, the battery is well-adapted for use as an on-board power source for vehicle propulsion. The vehicle is typically an automobile and may be, for example, a hybrid vehicle (HV), a plug-in hybrid vehicle (PHV), an electric vehicle (EV), a fuel cell vehicle, an electric-powered wheelchair or a power-assisted bicycle. According to another aspect, the invention also provides a vehicle equipped with any of the nonaqueous electrolyte secondary batteries disclosed herein (which may be in the form of battery packs).

REFERENCE SIGNS LIST

10 Positive electrode sheet (positive electrode)
12 Positive electrode current collector
14 Positive electrode active material layer
20 Negative electrode sheet (positive electrode)
22 Negative electrode current collector
24 Negative electrode active material layer
40 Separator sheet (separator)
50 Battery case
52 Battery case body
54 Lid
55 Safety valve
70 Positive electrode terminal
72 Negative electrode terminal
80 Wound electrode assembly
100 Nonaqueous electrolyte secondary battery

The invention claimed is:

1. A nonaqueous electrolyte secondary battery comprising an electrode assembly having a positive electrode and a negative electrode, and a nonaqueous electrolyte, wherein
the positive electrode has a positive electrode current collector and a positive electrode active material layer that is formed on the positive electrode current collector and includes at least a positive electrode active material and a conductive material,
the positive electrode active material includes at least a lithium-transition metal composite oxide,
the conductive material includes a lithium phosphate compound coated, on at least part of the surface thereof, with conductive carbon,
the lithium phosphate compound includes at least lithium iron phosphate,
the conductive carbon includes at least carbon black,
the conductive carbon is coated in an amount, per 100 parts by mass of the lithium phosphate compound, of from 40 parts by mass to 80 parts by mass,
the conductive carbon-coated lithium phosphate compound is configured to suppress direct contact between the lithium phosphate compound and the positive electrode active material, and
a proportion of the conductive material in the positive electrode active material layer is from 1% by mass to 10% by mass.

2. The nonaqueous electrolyte secondary battery according to claim 1, wherein a proportion of the conductive carbon-coated lithium phosphate compound in the conductive material is from 20% by mass to 70% by mass.

3. The nonaqueous electrolyte secondary battery according to claim 1, wherein the lithium phosphate compound has an average particle size for primary particles thereof, as determined by electron microscopy, of from 50 nm to 200 nm.

4. The nonaqueous electrolyte secondary battery according to claim 1, wherein the conductive carbon has an average particle size for primary particles thereof, as determined by electron microscopy, of from 30 nm to 50 nm.

5. The nonaqueous electrolyte secondary battery according to claim 1, wherein the positive electrode active material includes at least a lithium nickel cobalt manganese composite oxide having a layered structure.

6. The nonaqueous electrolyte secondary battery according to claim 1, wherein the conductive carbon-coated lithium phosphate compound and the positive electrode active material are both in a particulate form, and
   an average particle size for secondary particles of the conductive carbon-coated lithium phosphate compound is smaller than that of the positive electrode active material.

7. The nonaqueous electrolyte secondary battery according to claim 6, wherein the average particle size for secondary particles of the conductive carbon-coated lithium phosphate compound is from 0.05 to 1 μm.

8. A vehicle comprising the nonaqueous electrolyte secondary battery according to claim 1.

* * * * *